United States Patent
Hsu

(10) Patent No.: US 12,108,871 B2
(45) Date of Patent: Oct. 8, 2024

(54) BRUSH ROLLER AND ITS MANUFACTURING METHOD AND BRUSH ROLLER MOLD

(71) Applicant: Cenefom Corp., Miaoli County (TW)

(72) Inventor: Chen-Ping Hsu, Miaoli County (TW)

(73) Assignee: Cenefom Corp., Miaoli County (TW)

( * ) Notice: Subject to any disclaimer, the term of this patent is extended or adjusted under 35 U.S.C. 154(b) by 416 days.

(21) Appl. No.: 17/505,352

(22) Filed: Oct. 19, 2021

(65) Prior Publication Data
US 2022/0125193 A1  Apr. 28, 2022

(30) Foreign Application Priority Data
Oct. 22, 2020  (TW) .................................. 109136760

(51) Int. Cl.
A46D 3/00   (2006.01)
A46B 1/00   (2006.01)
(Continued)

(52) U.S. Cl.
CPC ................. *A46D 3/00* (2013.01); *A46B 1/00* (2013.01); *A46B 13/001* (2013.01); *A46B 13/02* (2013.01); *B29C 39/006* (2013.01); *B29C 39/02* (2013.01); *C08F 16/06* (2013.01); *C08J 3/05* (2013.01); *C08J 3/24* (2013.01); *A46B 2200/3073* (2013.01); *B29K 2029/04* (2013.01);
(Continued)

(58) Field of Classification Search
CPC .......... A46D 3/00; A46B 1/00; A46B 13/001; A46B 13/02; A46B 2200/3073; B29C 33/10; B29C 39/006; B29C 39/02; B29C 39/26; B29C 39/42; C08J 2329/04; C08J 3/05; C08J 3/24; C08J 9/30; B29L 2031/42; C08F 16/06; C08F 2810/20; B29K 2029/04; B29K 2105/0002; B29K 2105/0014
See application file for complete search history.

(56) References Cited

U.S. PATENT DOCUMENTS

2011/0204538 A1   8/2011   Drury

FOREIGN PATENT DOCUMENTS

CN   107216419 A   9/2017
JP   P2013-52368 A   3/2013

OTHER PUBLICATIONS

Official Action issued by Taiwan Intellectual Property Office on Jul. 21, 2021.
Official action issued by Korean on Apr. 3, 2024.

*Primary Examiner* — Yan Lan
(74) *Attorney, Agent, or Firm* — Chun-Ming Shih; LANWAY IPR SERVICES

(57) ABSTRACT

A brush roller and its manufacturing method and brush roller mold is provided, the brush roller is manufactured by foaming a gaseous pore filler, while solving the problem of using a solid pore filler foaming method to manufacture the brush roller. In addition, the brush roller of the present invention has a plurality of fluid channels communicating between any adjacent two, and the plurality of fluid channels respectively extend to the surface of the brush roller to form pores to improve the fluid permeability of the brush roller, and in the brush roller manufacturing method of the present invention, after the PVA emulsified solution is cured, the compressive stress under the condition of the predetermined compression ratio can be formed to meet the expected brush roller, and it can be used to brush the circuit substrate.

7 Claims, 11 Drawing Sheets

(51) Int. Cl.
*A46B 13/00* (2006.01)
*A46B 13/02* (2006.01)
*B29C 39/00* (2006.01)
*B29C 39/02* (2006.01)
*C08F 16/06* (2006.01)
*C08J 3/05* (2006.01)
*C08J 3/24* (2006.01)
*B29K 29/00* (2006.01)
*B29K 105/00* (2006.01)
*B29L 31/42* (2006.01)

(52) U.S. Cl.
CPC ............... *B29K 2105/0002* (2013.01); *B29K 2105/0014* (2013.01); *B29L 2031/42* (2013.01); *C08F 2810/20* (2013.01); *C08J 2329/04* (2013.01)

X partial enlarged

Y partial enlarged

BRUSH ROLLER AND ITS MANUFACTURING METHOD AND BRUSH ROLLER MOLD

CROSS-REFERENCE TO RELATED APPLICATIONS

This application claims the priority of Republic of China Patent Application No. 109136760 filed on Oct. 22, 2020, in the State Intellectual Property Office of the R.O.C., the disclosure of which is incorporated herein by reference.

BACKGROUND OF THE INVENTION

Field of the Invention

The present invention relates to a brush roller for brushing circuit substrates, and its manufacturing method and the brush roller mold.

Descriptions of the Related Art

In the light of the electronic industry, it is often necessary to use brush rollers to brush the contaminants remaining on the surface of the circuit substrates. At present, the manufacture of brush rollers usually requires the addition of solid hole fillers to carry out foaming, thereby make the physical properties of the finished brush rollers meet the requirements. Solid materials such as starch, calcium carbonate, sodium bicarbonate, magnesium silicate, blanc fixe, quartz powder, gesso, Celite, kaolin, colophonium and glass powder can all be used as solid hole fillers, and starch is the most commonly used solid hole filler.

However, there are problems with residues because the solid hole filler is not easy to be removed from the finished brush roller. The current brush rollers used for brushing circuit substrates often suffer from poor fluid penetrability since the internal pores are filled with solid hole fillers. Under these circumstances, the brushing liquid is difficult to pass through, resulting in the brushing efficiency of the circuit substrate is not as expected. The solid hole filler remaining on the brush roller may even fall off and stick to the circuit substrate during brushing the circuit substrate by the brush roller, thereby affecting the yield of the circuit substrate.

If starch is used as a solid filler in the brush roller, the remaining solid hole filler of starch will easily breed bacteria. To prevent the residual starch of the solid hole filler from breeding bacteria on the brush roller, additives such as bactericide and bacteriostatic agents will be added to the brush roller. However, these additives are also easy to remain on the brush roller and will affect the yield of the circuit substrate.

Because the internal residues (i.e., solid hole filler) of the brush roller will affect the yield of the circuit substrate, it usually takes hours or even days to practice cleaning and removing program of the residue on the machine before using the brush roller to brush the circuit board in the industry. Doing so will lead to a decline in the machine utilization rate on the production line.

Because of this, how to solve the various problems brought by the use of the brush roller due to the brush roller having residues caused by the solid hole filler is the technical issue to be solved in this case.

SUMMARY OF THE INVENTION

Given the shortcomings of the above-mentioned prior art, the present invention provides a brush roller manufacturing method, which to manufacture a brush roller, comprising the following steps: preparing a PVA material, a cross-linking agent, a gaseous hole filler, and a brush roller mold; resolving the PVA material in water to form a PVA aqueous solution; adding the cross-linking agent into the PVA aqueous solution to allow the PVA material in the PVA aqueous solution for undergoing a cross-linking reaction and forming a PVA cross-linking solution; adding the gaseous hole filler into the PVA cross-linking solution, and homogenizing the gaseous hole filler and the PVA cross-linking solution by stirring to form a PVA emulsified solution, which comprises bubbles formed by the gaseous hole filler with substantially homogeneous distribution; and placing the PVA emulsified solution into the brush roller mold until the PVA emulsified solution curing to a solid-state and forming the brush roller with desired compressive stress under the condition of a predetermined compression ratio; meanwhile, any adjacent two of the bubbles with a substantially homogeneous distribution in the PVA emulsified solution will connect to create a plurality of fluid passages on the brush roller, and any adjacent two of the plurality of fluid passages will connect as well and extend to the surface of the brush roller to create pores to provide the flow of fluid.

Preferably, the brush roller manufacturing method said above, wherein a catalyst is further prepared and added during the formation of the PVA cross-linking solution or the PVA emulsified solution, thereby the PVA cross-linking solution or the PVA emulsified solution contains the catalyst to catalyze the cross-linking reaction, wherein the weight percentage of the catalyst in the PVA emulsified solution is between 1.5%-5%; the catalyst comprises at least a component selected from the group consisting of hydrochloric acid, sulfuric acid, phosphoric acid, and nitric acid.

Preferably, the brush roller manufacturing method said above, wherein a surfactant is further prepared and added during the formation of the PVA cross-linking solution or the PVA emulsified solution, thereby the PVA cross-linking solution or the PVA emulsified solution contains the surfactant for maintaining the bubble state in the PVA emulsified solution, wherein the weight percentage of the surfactant in the PVA emulsified solution is between 0.4%-1.4%; the surfactant comprises at least a component selected from the group consisting of polypropylene glycol) diglycidyl ether, polyoxyethylene seearate, polyoxyethylene octylphenyl ether, and sodium dodecyl benzene sulfonate.

Preferably, the brush roller manufacturing method said above, wherein the weight percentage of the cross-linking agent in the PVA emulsified solution is between 3%-9%; the cross-linking agent comprises at least a component selected from the group consisting of formaldehyde, acetaldehyde, glyoxal, propanal, butyraldehyde, butanedial, and glutaraldehyde.

Preferably, the brush roller manufacturing method said above, wherein the volume ratio of the gaseous hole filler in the PVA emulsified solution is between 31%-45%.

Preferably, the brush roller manufacturing method said above, wherein the curing temperature of the PVA emulsified solution is between 42° C.-65° C.

Preferably, the brush roller manufacturing method said above, wherein the brush roller mold is rotated to reduce the floating area of the bubbles of the PVA emulsified solution during the curing process of the PVA emulsified solution in the brush roller mold, thereby the bubbles in the PVA emulsified solution maintain the substantially homogeneous distribution.

Moreover, the present invention further provides a brush roller using the brush roller manufacturing method said above.

Preferably, the brush roller said above, wherein the surface of the brush roller has a plurality of brush blocks, and each brush block has a brush body and at least one side support, which is combined with the brush body and flanks the brush body to provide lateral support to the brush body.

Preferably, the brush roller said above, wherein the side support is a circular side support constituted by extending along the flanks of the brush body.

Preferably, the brush roller said above, wherein the side support is two side supports flanked the brush body on both sides.

Preferably, the brush roller said above, wherein the side support is four side supports flanked the brush body on four sides.

Preferably, the brush roller said above, wherein the side support is a triangular prism.

Moreover, the present invention further provides a brush roller mold, which is provided for placing the PVA emulsified solution to manufacture the brush roller said above, the brush roller mold comprises: a mold cavity having a brush body forming part and a side support forming part, where the brush body forming part is used to form the brush body, and the side support forming part is used to form the side support; wherein the side support forming part has an auxiliary exhaust structure, which flanks the brush body forming part to assist in exhausting a prior gas originally present in the mold cavity during the process of placing the PVA emulsified solution, thereby prevents the prior gas from remaining in the mold cavity causing the pore distribution of the finished brush roller cannot be substantially homogeneous.

Preferably, the brush roller mold said above, wherein the auxiliary exhaust structure is a guided incline to guide the prior gas to leave the mold cavity, so as to assist in exhausting the prior gas.

Compared to prior arts, the present invention provides a brush roller and its manufacturing method and the brush roller mold. The brush roller that contains pores and provides fluid penetrability is manufactured by foaming a gaseous hole filler, thereby solving the prior art problems derived from the brush roller with the residue of the solid hole filler due to manufacturing the brush roller by foaming the solid hole filler. Besides, in the brush roller manufacturing method of the present invention, the brush roller with desired compressive stress under the condition of a predetermined compression ratio can be formed after the PVA emulsified solution being cured, and it can use for brushing the circuit substrates. Moreover, the brush roller has a plurality of fluid passages with a connection in any adjacent two of them, and said plurality of fluid passages separately extend to the surface of the brush roller to create pores to provide the flow of fluid. In this way, the brush roller of the present invention has excellent fluid penetrability.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
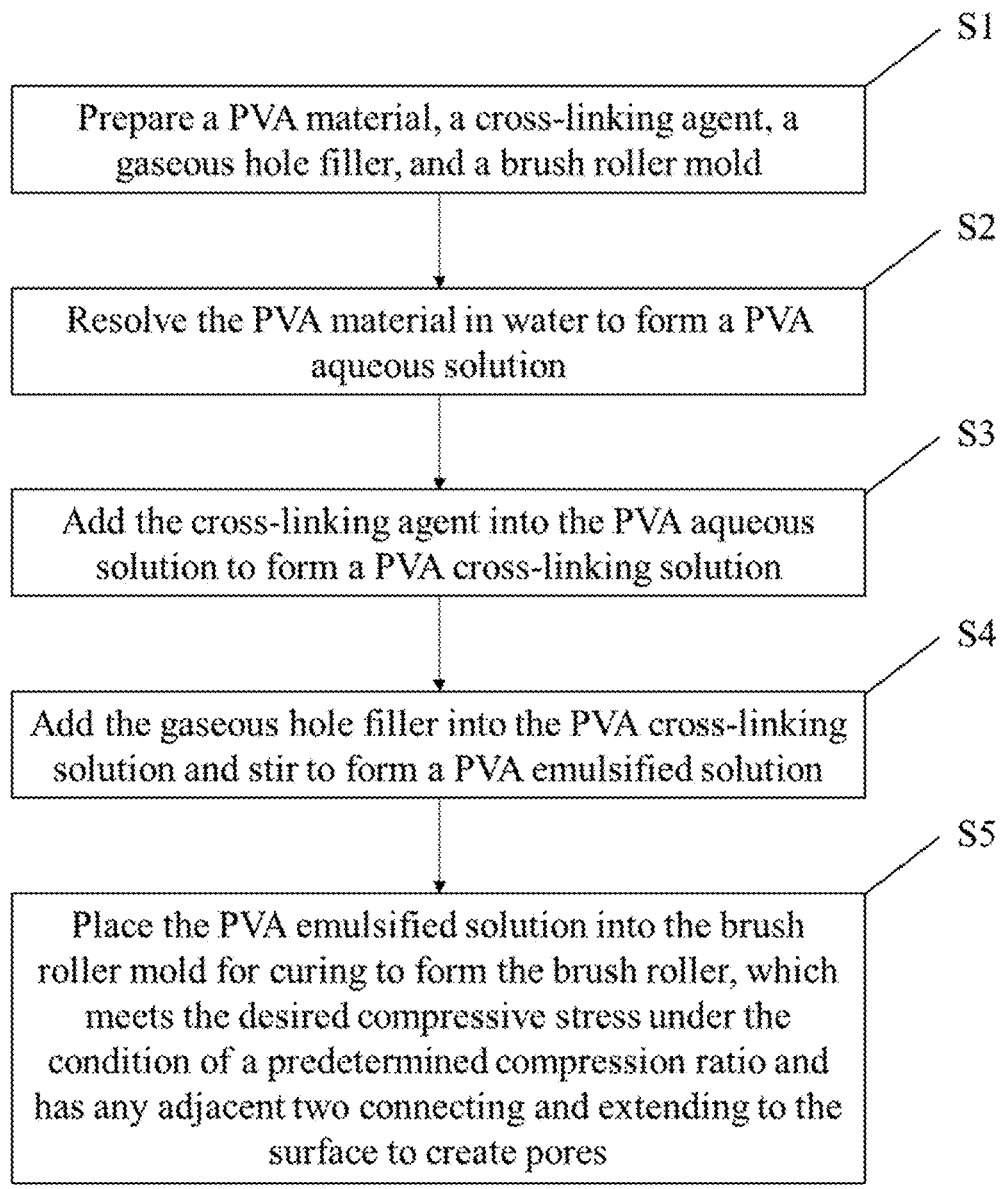
FIG. 1 is a schematic flow diagram of the brush roller manufacturing method of the present invention.
Figure 2:
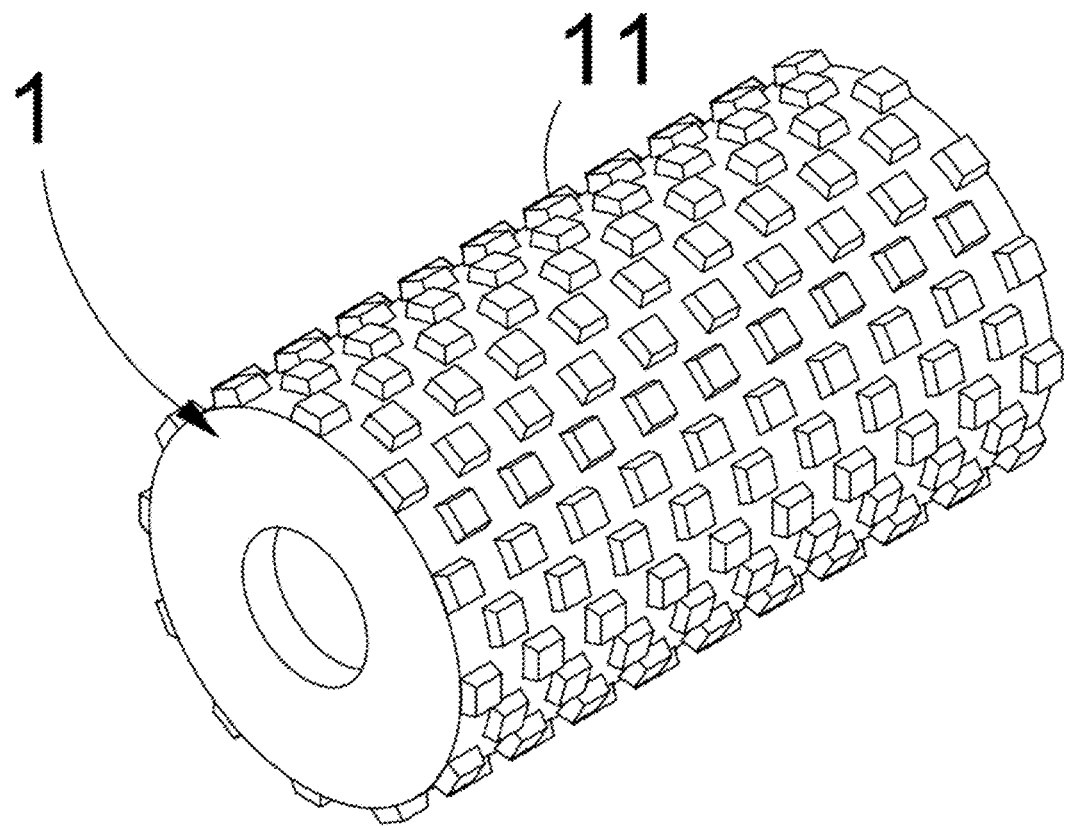
FIG. 2 is a three-dimensional schematic diagram of an embodiment of the brush roller of the present invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like components.

The present invention provides a brush roller and its manufacturing method and the brush roller mold. The brush roller being manufactured can be used in, for example, brushing circuit substrates of semiconductor wafers. The brush roller is manufactured mainly by using gaseous hole filler to carry out foaming so that there are no residues inside the finished brush roller, and the physical properties meet the needs of brushing circuit substrates.

Regarding the physical properties of the above-mentioned brush roller, the physical property of the fluid penetrability (or porosity) of the brush roller is strictly required to prevent damages to the circuit substrates during brushing, since there are integrated circuits on the circuit substrate. Therefore, the brush roller should have enough pores for the brushing liquid to pass through, so the brushing liquid takes effect during brushing the circuit substrate. Besides, in the process of brushing the circuit substrate, the brushing efficiency of the brush roller to the circuit substrate will not be as expected if the compression stress of the brush roller under the condition of the predetermined compression ratio is less than the lower range value of the appropriate interval; in addition, the brushing by the brush roller will easily damage the circuit substrate if the compression stress of the brush roller under the condition of the predetermined compression ratio is greater than the upper range value of the appropriate interval. Therefore, the physical property of compressive stress of the brush roller under the condition of the predetermined compression ratio is also strictly required, which should meet the appropriate interval value between the upper range value and the lower range value.

For the technical idea of the present invention, please refer to the disclosures of FIGS. 1 to 11 together.

As shown in FIG. 1, the manufacturing method of the brush roller mainly comprises the following steps:

Step S1: A PVA (Polyvinyl Alcohol) material, a cross-linking agent, a gaseous hole filler, and a brush roller mold are prepared.

Step S2: the PVA material is resolved in water to form a PVA aqueous solution.

Step S3: the cross-linking agent is added into the PVA aqueous solution to allow the PVA material in the PVA aqueous solution for undergoing a cross-linking reaction, and a PVA cross-linking solution is formed. Said cross-linking agent may optionally at least comprise a component selected from the group consisting of formaldehyde, acetaldehyde, glyoxal, propanal, butyraldehyde, butanedial, and glutaraldehyde. Moreover, the mixture of the PVA aqueous solution and the cross-linking agent can be stirred to homogenize the PVA aqueous solution and the cross-linking agent.

Step S4: the gaseous hole filler is added into the PVA cross-linking solution, and the gaseous hole filler and the PVA cross-linking solution are homogenized by stirring to form a PVA emulsified solution, wherein the PVA emulsified solution comprises bubbles with substantially homogeneous distribution formed by the gaseous hole filler. Said gaseous hole filler mainly forms bubbles in the PVA emulsified solution without participating in the chemical reaction. Hence, the gaseous hole filler can be selected as air, or at least comprises a component selected from the group consisting of inert gases such as nitrogen and helium.

In the brush roller manufacturing method of the present invention, a catalyst may be further prepared and added during the formation of the PVA cross-linking solution or the PVA emulsified solution, so the PVA cross-linking solution or the PVA emulsified solution contains the catalyst to catalyze the cross-linking reaction, thus allowing for the formation of the PVA cross-linking solution is in line with expectations. Said catalyst may optionally at least comprise a component selected from the group consisting of hydrochloric acid, sulfuric acid, phosphoric acid, and nitric acid.

In the brush roller manufacturing method of the present invention, a surfactant may be further prepared and added during the formation of the PVA cross-linking solution or the PVA emulsified solution, so the PVA cross-linking solution or the PVA emulsified solution contains the surfactant for maintaining the bubble state in the PVA emulsified solution. Said surfactant may optionally at least comprise a component selected from the group consisting of poly(propylene glycol) diglycidyl ether, polyoxyethylene seearate, polyoxyethylene octylphenyl ether, and sodium dodecyl benzene sulfonate.

Figure 4:
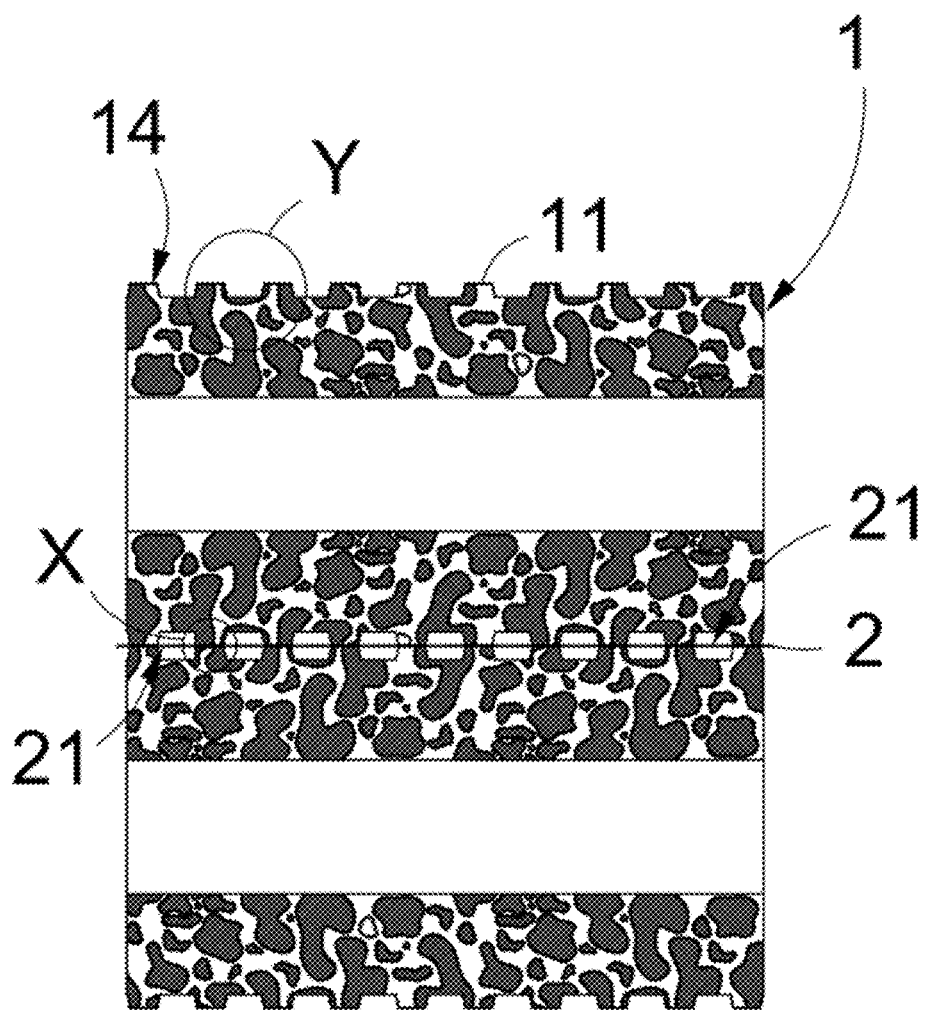
FIG. 4 is a schematic diagram of pores in the brush roller of the present invention, in which any adjacent two of the plurality of fluid passages are connected and extended to the surface of the brush roller to create pores to provide the flow of fluid.
Figure 5:
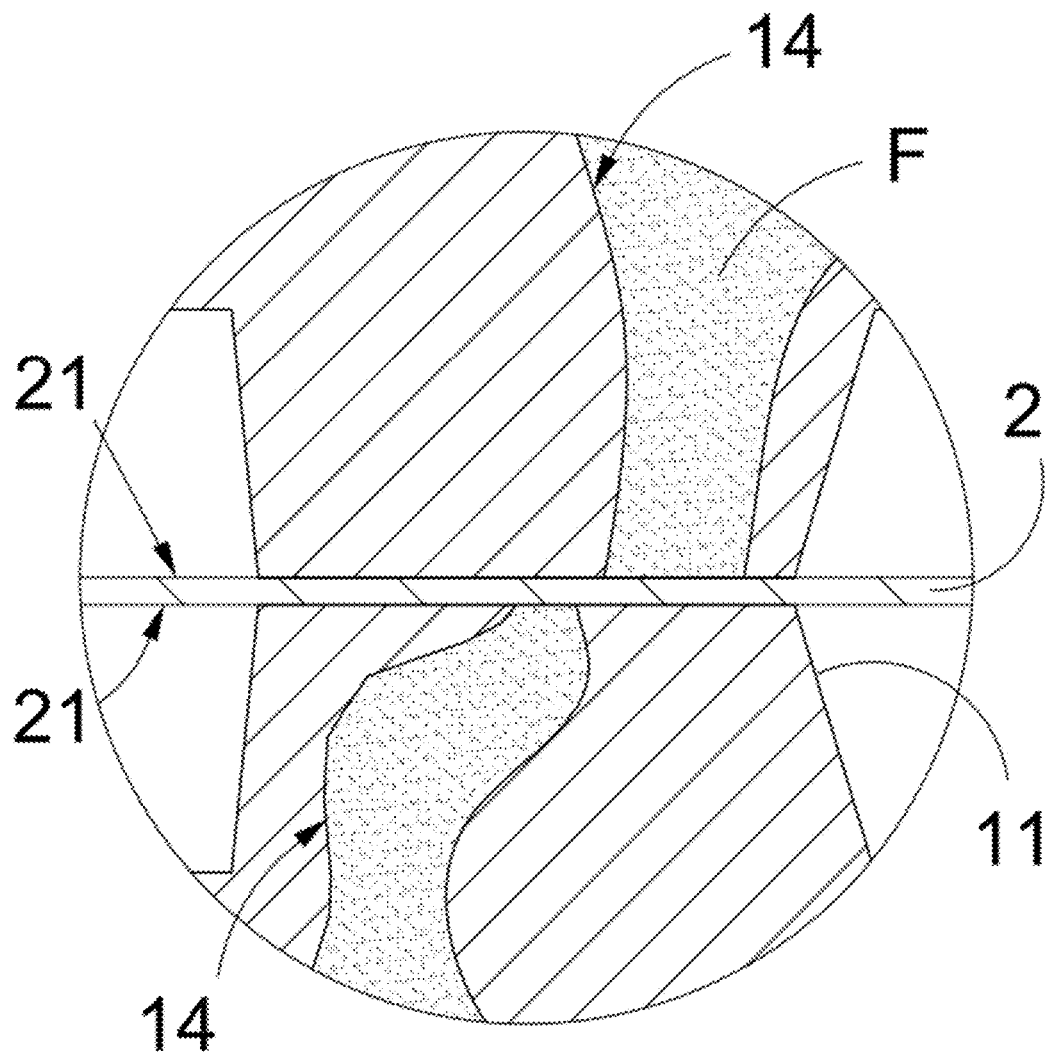
FIG. 5 is respectively partial enlarged view of the area indicated by the symbols X in FIG. 4.
Figure 6:
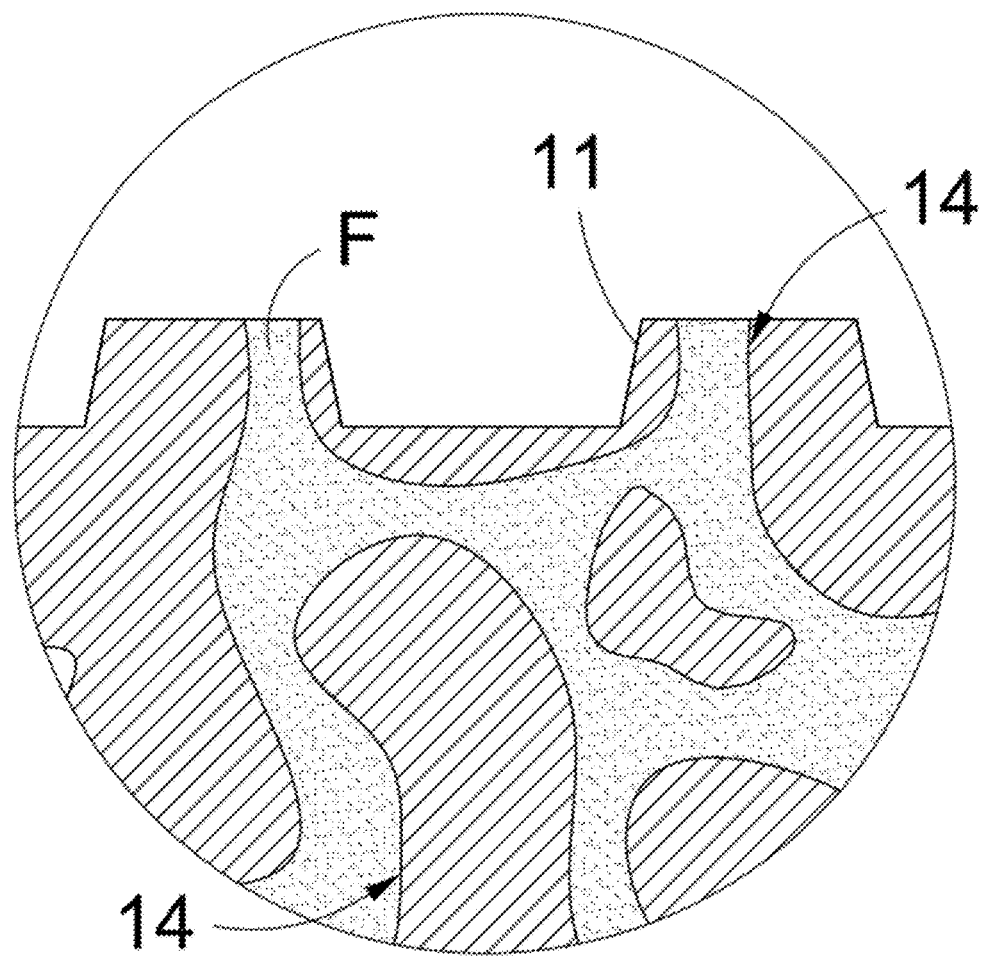
FIG. 6 is respectively partial enlarged view of the area indicated by the symbols Y in FIG. 4.
Figure 9:
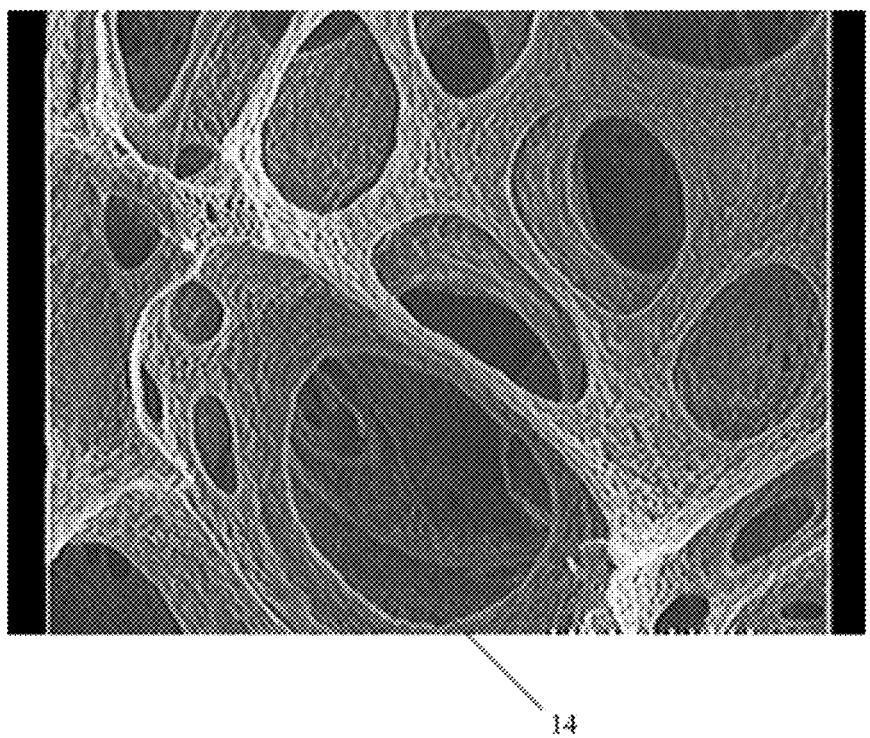
FIG. 9 is a high-resolution image of the pores in the brush roller of the present invention.

Step S5: the PVA emulsified solution is placed into the brush roller mold until the PVA emulsified solution cures to solid-state forming the brush roller with desired compressive stress under the condition of a predetermined compression ratio. At this time, as shown in FIGS. 4 to 6, any adjacent two of the bubbles with a substantially homogeneous distribution in the PVA emulsified solution will connect to create a plurality of fluid passages on the brush roller, and any adjacent two of the plurality of fluid passages will connect as well and extend to the surface of the brush roller to create pores to provide the flow of fluid F, whereby raises the fluid penetrability (or porosity) of the brush roller. The pores formed in step S5 have an open-cell structure as shown in FIG. 9, that makes the brush roller of the present invention have good fluid penetrability.

Besides, the bubbles distributed in the PVA emulsified solution after curing to the solid-state will form pores for fluid to pass through, since the PVA emulsified solution has the gaseous hole filler in the form of bubbles and contains bubbles. To raise the fluid penetrability of the brush roller, accordingly, it can be achieved by increasing the addition amount of the gaseous hole filler.

Preferably, the weight percentage of the above-mentioned catalyst in the PVA emulsified solution is optionally between 1.5%-5%; the weight percentage of the above-mentioned surfactant in the PVA emulsified solution is optionally between 0.4%-1.4%; the weight percentage of the above-mentioned cross-linking agent in the PVA emulsified solution is optionally between 3%-9%; the volume ratio of the gaseous hole filler in the PVA emulsified solution is optionally between 31%-45%; the curing temperature of the PVA emulsified solution is between 42° C.-65° C.; in this way, the physical properties, such as the fluid penetrability and the compressive stress under the condition of a predetermined compression ratio, meet appropriate values.

In the present invention, the compressive stress of the brush roller has the appropriate interval value between the upper range value and the lower range value. According to ASTM (Standard Test Methods for Flexible Cellular Materials), the lower range value of the appropriate interval value of the compressive stress should be 60 g/cm$^2$ and the upper range value of the appropriate interval value of the compressive stress should be 100 g/cm$^2$ under the condition of the predetermined compression ratio of 30%. It should be noted that the brushing efficiency of the circuit substrate can meet the expectation when the compression stress of the brush roller under the condition of the predetermined compression ratio is higher than the lower range value of the appropriate interval, and the damages to the circuit substrate during the brushing process can be avoided when the compression stress of the brush roller under the condition of the predetermined compression ratio is less than the upper range value of the appropriate interval. To make the compressive stress of the brush roller under the condition of the predetermined compression ratio meet the appropriate interval value of the above-mentioned compressive stress, some of the manufacturing parameters of the brush roller manufacturing method of the present invention are selected as follows: the weight percentage of the PVA material in the PVA emulsified solution is between 6%-18%, the weight percentage of the cross-linking agent in the PVA emulsified solution is between 3%-9%, the weight percentage of the catalyst in the PVA emulsified solution is between 1.3%-5%, the volume ratio of the gaseous hole filler in the PVA emulsified solution is between 20%-50%, the curing temperature of the PVA emulsified solution is between 42° C.-65° C.

In the present invention, the appropriate value of the porosity of the brush roller according to ASTM (Standard Test Method for Determination of Pore Volume and Pore Volume Distribution of Soil and Rock by Mercury Intrusion Porosimetry) should be between 88%-95% measured by a mercury porosimetry. In this way, the fluid penetrability of the brush roller can meet the expectations, allowing the brushing fluid for passing through to provide an effect on brushing to the circuit substrate. Therefore, the brush roller of the present invention can effectively complete the brushing to the circuit substrate. To make the porosity of the brush roller meet the appropriate value of the above-mentioned porosity, some of the manufacturing parameters of the brush roller manufacturing method of the present invention are selected as follows: The weight percentage of the PVA material in the PVA emulsified solution is between 8%-20%, the weight percentage of the cross-linking agent in the PVA emulsified solution is between 3%-10%, the weight percentage of the surfactant in the PVA emulsified solution is between 0.4%-1.4%, the weight percentage of the catalyst in the PVA emulsified solution is between 1.5%-8%, the volume ratio of the gaseous hole filler in the PVA emulsified solution is between 31%-45%, the curing temperature of the PVA emulsified solution is between 40° C.-70° C.

Accordingly, to meet the appropriate values of the above-mentioned porosity and compressive stress at the same time, some of the manufacturing parameters of the brush roller manufacturing method of the present invention are selected as follows: the weight percentage of the PVA material in the PVA emulsified solution is between 8%-18%, the weight percentage of the cross-linking agent in the PVA emulsified solution is between 3%-9%, the weight percentage of the surfactant in the PVA emulsified solution is between 0.4%-1.4%, the weight percentage of the catalyst in the PVA emulsified solution is between 1.5%-5%, the volume ratio of the gaseous hole filler in the PVA emulsified solution is between 31%-45%, the curing temperature of the PVA emulsified solution is between 42° C.-65° C.

To make the disclosures of the technical idea of the present invention clear, the following describes specific embodiments so that those skilled in the art can easily understand the advantages and effects of the present invention.

In an embodiment of the present invention, some of the manufacturing parameters of the brush roller manufacturing method of the present invention are selected as follows: the weight percentage of the PVA material in the PVA emulsified solution is 8%, the weight percentage of the cross-linking agent in the PVA emulsified solution is 3%, the weight percentage of the catalyst in the PVA emulsified solution is 1.5%, the weight percentage of the surfactant in the PVA emulsified solution is 1.4%, the volume ratio of the gaseous hole filler in the PVA emulsified solution is 45%, the curing temperature of the PVA emulsified solution is 42° C. The brush roller made in this way is in the ASTM standard experiment, in which the porosity is 94% and the compressive stress is 62 g/cm² under the condition of the predetermined compression ratio of 30%. It can meet the appropriate interval values of the above-mentioned porosity and compressive stress under the condition of the predetermined compression ratio at the same time.

In another embodiment of the present invention, some of the manufacturing parameters of the brush roller manufacturing method of the present invention are selected as follows: the weight percentage of the PVA material in the PVA emulsified solution is 18%, the weight percentage of the cross-linking agent in the PVA emulsified solution is 9%, the weight percentage of the catalyst in the PVA emulsified solution is 5%, the weight percentage of the surfactant in the PVA emulsified solution is 0.4%, the volume ratio of the gaseous hole filler in the PVA emulsified solution is 31%, the curing temperature of the PVA emulsified solution is 65° C. The brush roller made in this way is in the ASTM standard experiment, in which the porosity is 88% and the compressive stress is 97 g/cm² under the condition of the predetermined compression ratio of 30%. It can meet the appropriate interval values of the above-mentioned porosity and compressive stress under the condition of the predetermined compression ratio at the same time.

Therefore, the finished brush roller is in the ASTM standard experiment in the present invention. The higher the volume ratio of the gaseous hole filler in the PVA emulsified solution, the higher the porosity of the brush roller; moreover, this will also cause the higher the fluid penetrability of the brush roller, the lower the compressive stress under the condition of the predetermined compression ratio. At this time, the damages to the circuit substrate during the brushing process can be avoided if the compression stress of the brush roller under the condition of the predetermined compression ratio is less than the above-mentioned upper range value. In other words, by reducing the volume ratio of the gaseous hole filler in the PVA emulsified solution, the porosity of the brush roller can be reduced and the compressive stress value of the brush roller under the condition of the predetermined compression ratio can be increased. At this time, the brushing efficiency of the brush roller to the circuit substrate can meet the expectation if the compression stress under the condition of the predetermined compression ratio is higher than the above-mentioned lower range value and meets the above-mentioned appropriate interval value of the compression stress.

Besides, the higher the weight percentage of PVA material in the PVA emulsified solution causes both the lower the porosity of the brush roller and the higher the compressive stress under the predetermined compression ratio. At this time, the brushing efficiency of the brush roller to the circuit substrate can meet the expectation if the compression stress under the condition of the predetermined compression ratio is higher than the above-mentioned lower range value and meets the above-mentioned appropriate interval value of the compression stress. In other words, by lowering the weight percentage of PVA material in the PVA emulsified solution, the porosity of the brush roller can be higher and the compressive stress under the condition of the predetermined compression ratio can be lower. At this time, the damages to the circuit substrate during the brushing process can be avoided if the compression stress under the condition of the predetermined compression ratio is less than the above-mentioned upper range value.

Besides, the higher the weight percentage of catalyst in the PVA emulsified solution, the faster the cross-linking reaction of the PVA material in the PVA emulsified solution. This causes the lower porosity of the brush roller and the higher compressive stress value under the condition of the predetermined compression ratio. At this time, the brushing efficiency of the brush roller to the circuit substrate can meet the expectation if the compression stress under the condition of the predetermined compression ratio is higher than the above-mentioned lower range value and meets the above-mentioned appropriate interval value of the compression stress. In other words, by lowering the weight percentage of the catalyst in the PVA emulsified solution, the porosity of the brush roller can be higher and the compressive stress under the condition of the predetermined compression ratio can be lower. At this time, the damages to the circuit substrate during the brushing process can be avoided if the compression stress under the condition of the predetermined compression ratio is less than the above-mentioned upper range value.

Furthermore, the higher the curing temperature of the PVA emulsified solution, the lower the porosity of the brush roller and the higher the compressive stress under the predetermined compression ratio. At this time, the brushing efficiency of the brush roller to the circuit substrate can meet the expectation if the compression stress under the condition of the predetermined compression ratio is higher than the above-mentioned lower range value and meets the above-mentioned appropriate interval value of the compression stress. In other words, by lowering the curing temperature of the PVA emulsified solution, the porosity of the brush roller can be higher and the compressive stress under the condition of the predetermined compression ratio can be lower. At this time, the damages to the circuit substrate during the brushing process can be avoided if the compression stress under the condition of the predetermined compression ratio is less than the above-mentioned upper range value.

Figure 3:
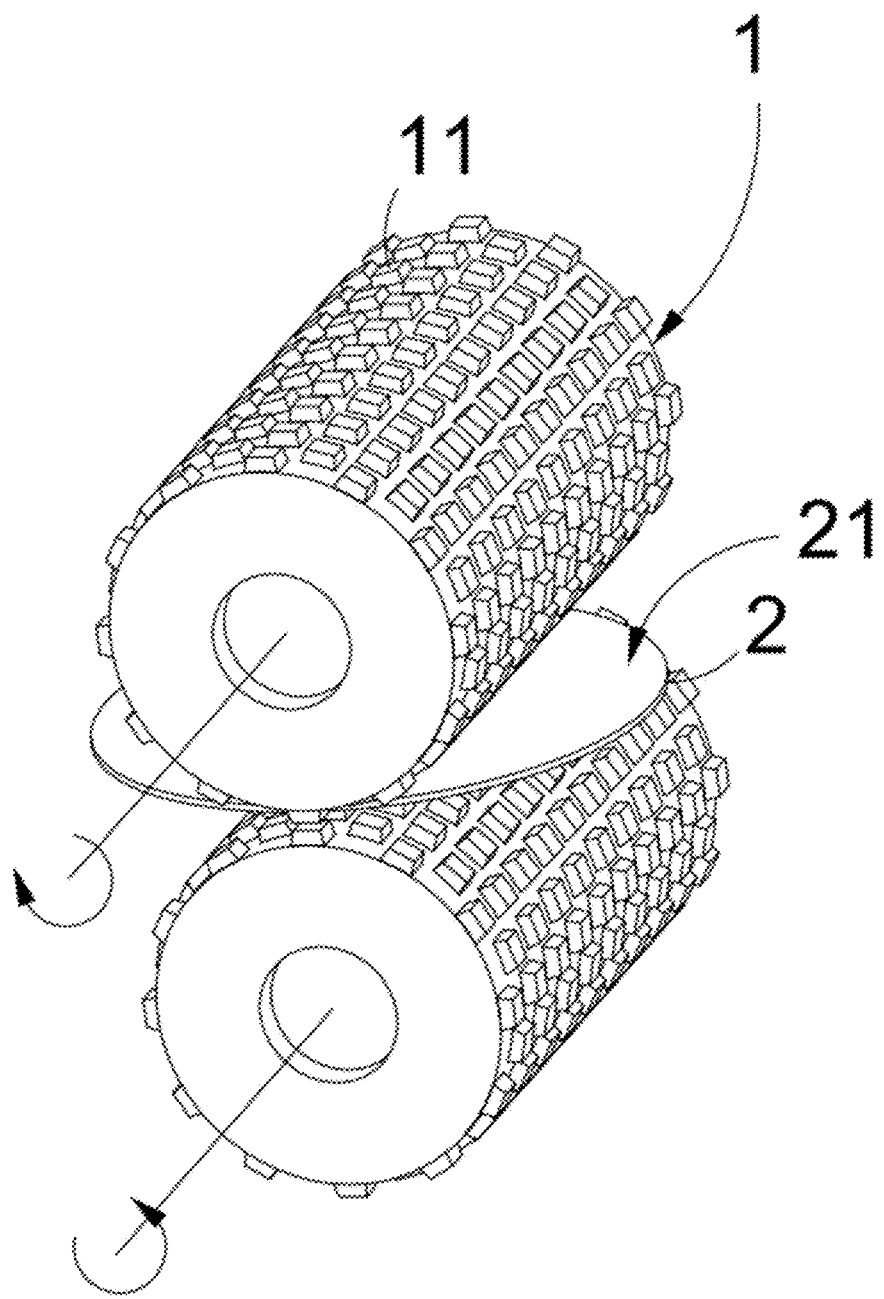
FIG. 3 is a schematic diagram of the use state of the brush roller shown in FIG. 2.

Please refer to the schematic diagrams of the embodiments in FIGS. 2 to 8. Regarding the brush roller provided by the present invention, the surface of brush roller 1 has a plurality of brush blocks 11 for brushing the circuit substrate. During brushing the circuit substrate 2, as shown in FIGS. 3 to 4, the brush blocks 11 of the finished brush roller 1 must first contact the surface to be clean 21 on the circuit substrate 2, and then the brush roller 1 will be driven to rotate.

Figure 7:
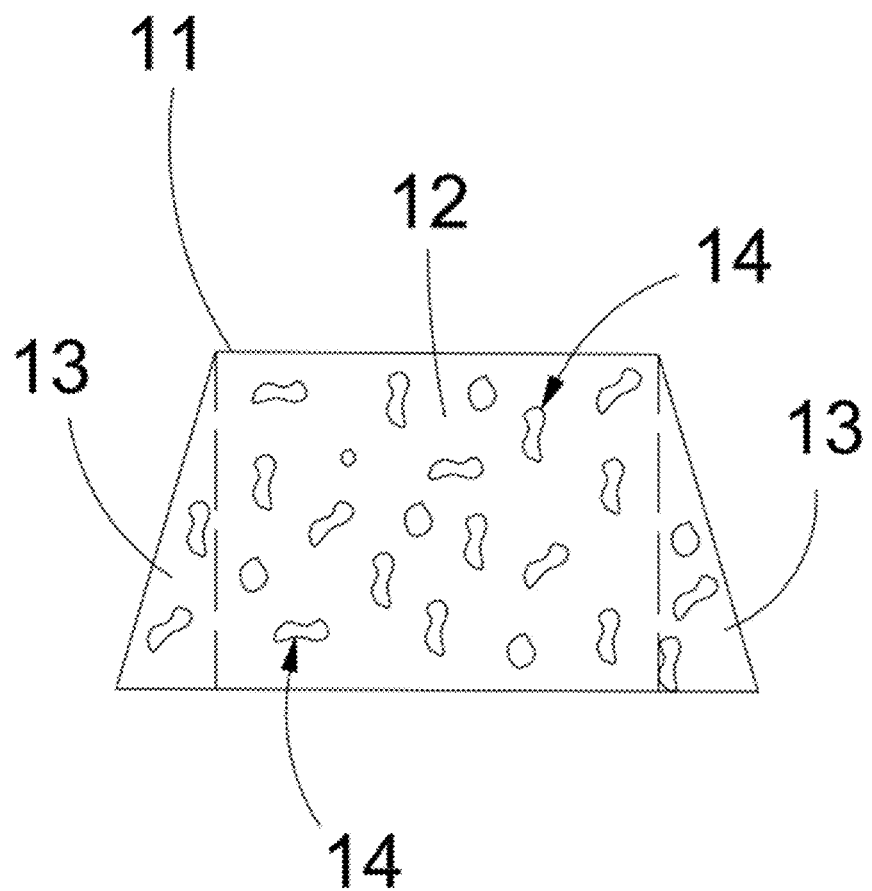
FIG. 7 is a schematic side view of the first embodiment of the brush block of the brush roller of the present invention.

Since the brush blocks 11 are easily deformed due to the stress during brushing so that the contact area with the circuit substrate 2 will decrease, the brushing efficiency of the brush blocks 11 to the circuit substrate 2 will further be affected. In this regard, as shown in FIG. 7, the brush block 11 of the present invention has a brush body 12 and at least one side support 13, which is combined with the flank(s) of the brush body 12 to provide lateral support to the brush body 12. Therefore, the level of the lateral deformation of the brush body 12 caused by the stress will decrease when the brush block 11 brushes the circuit substrate 2.

Figure 8:
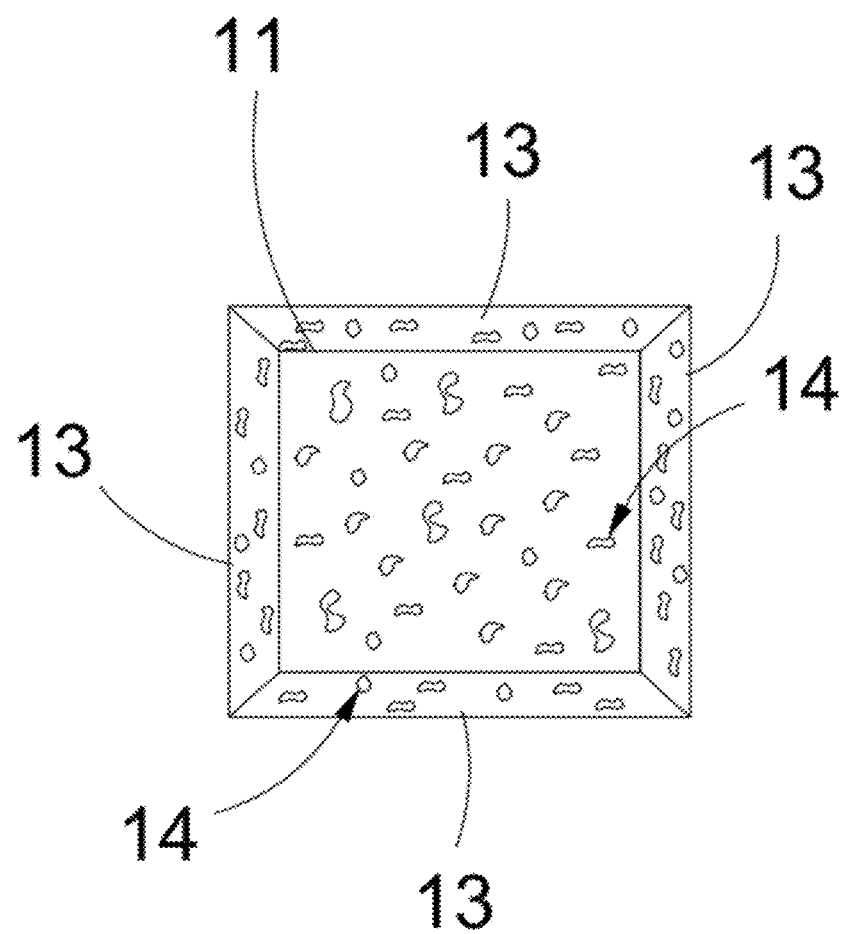
FIG. 8 is a schematic top view of the second embodiment of the brush block of the brush roller of the present invention.

As shown in FIG. 7, the brush block 11 has, but are not limited to, two side supports 13, which are set separately to flank the brush body 12 on both sides, so as to provide lateral support to the brush body 12 on both sides of the brush body 12. For example, setting only one side support can be selected as well, the set side support is extended along the flanks of the brush body to constitute a circular shape. Also, as shown in FIG. 8, setting the side supports 13 on the four sides of the brush body 12 separately can be selected too.

As shown in FIG. 7, the side support is a triangular prism. When the brush block 11 brushes the circuit substrate 2, the brush body 12 will be subjected to an effect of shearing force. At this time, the side support 13 of the triangular prism will provide lateral support to the brush body 12.

Figure 10:
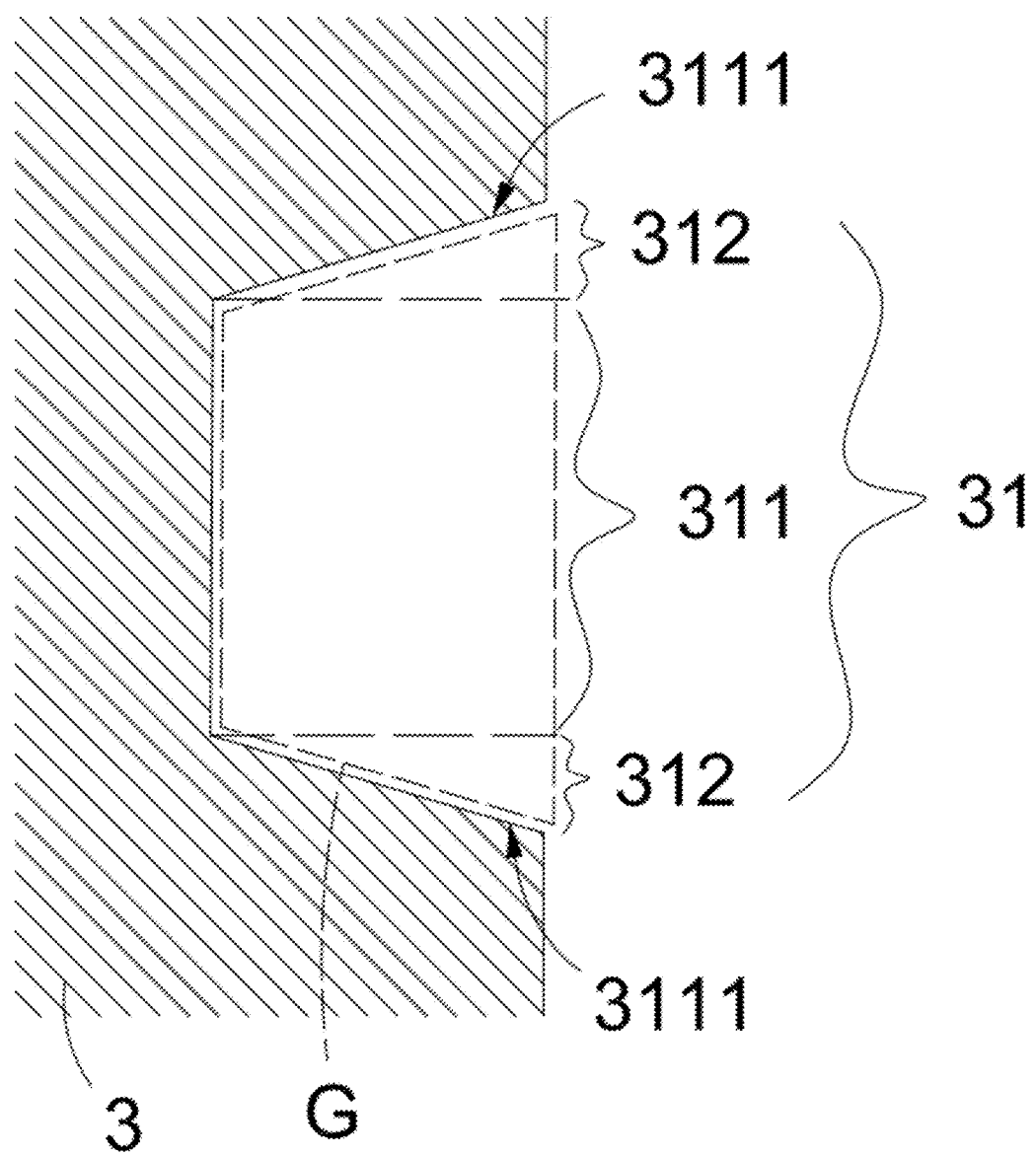
FIG. 10 is a partial schematic diagram of the mold cavity of the brush roller mold of the present invention.
Figure 11:
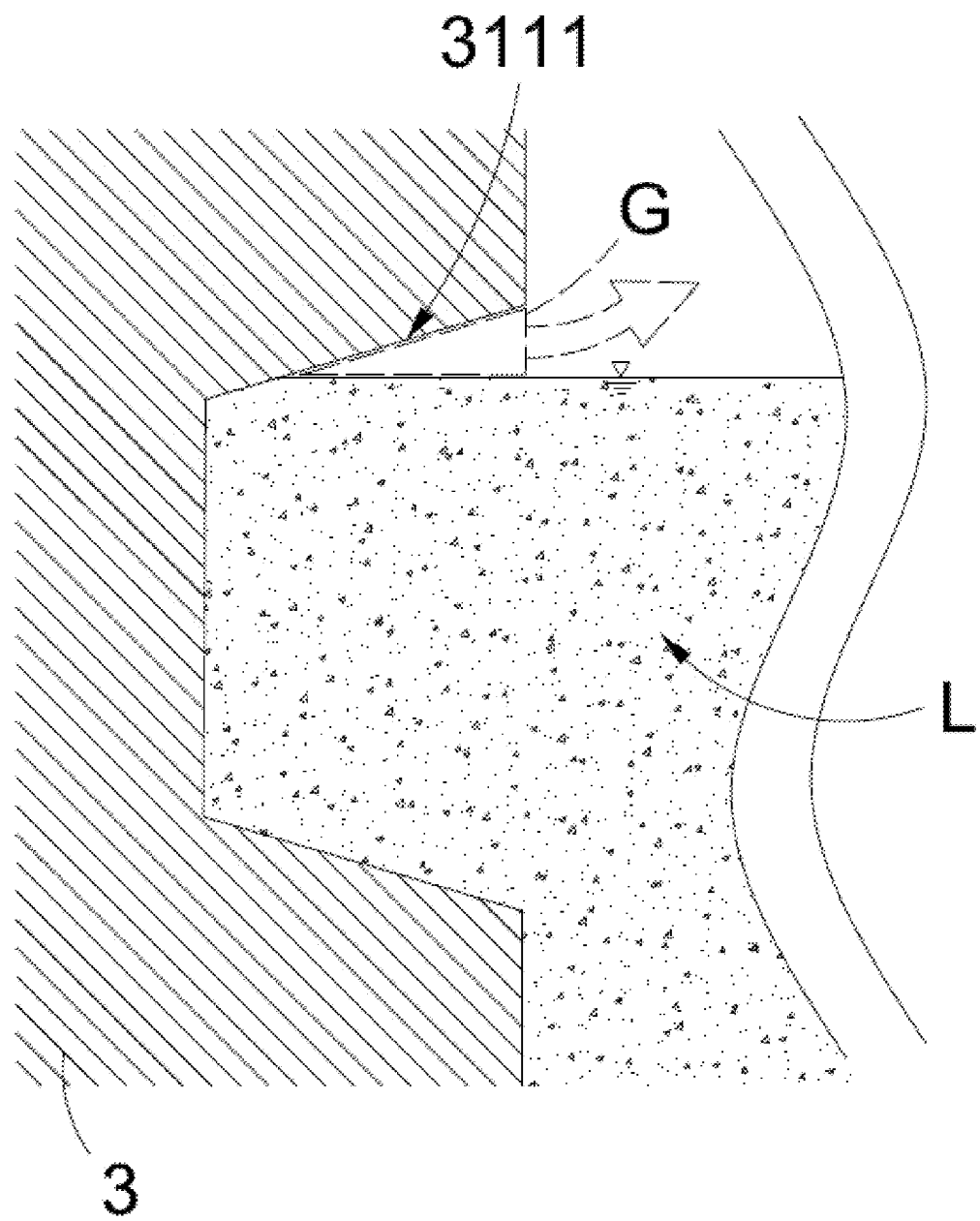
FIG. 11 is a schematic diagram of exhausting a prior gas during the PVA emulsified solution being placed in the mold cavity of the brush roller mold shown in FIG. 10.

As shown in FIGS. 10 to 11, it should be noted that the brush roller mold 3 of the present invention is used to provide the PVA emulsified solution L to manufacture the above-mentioned brush roller 1. The brush roller mold 3 of the present invention comprises a mold cavity 31, which has a brush body forming part 311 for forming the brush body 12 and a side support forming part 312 for forming the side support 13. Said side support forming part 312 has an auxiliary exhaust structure 3111, such as a guided incline. The auxiliary exhaust structure 3111 flanks the brush body forming part 311 to guide the prior gas G to leave the mold cavity 31 in the direction of the arrow as shown in FIG. 11 during the process of the PVA emulsified solution being placed in, and to achieve the assistance in exhausting a prior gas originally present in the mold cavity 31. It prevents the prior gas G remaining in the mold cavity 31 from entering the PVA emulsified solution, which causes the pore distribution of the finished brush roller cannot be substantially homogeneous.

In the curing process of PVA emulsified solution in the brush roller mold, moreover, bubbles are often affected by buoyancy and float and gather in local areas in the PVA emulsified solution, resulting in the nonhomogeneous distribution of bubbles in the PVA emulsified solution. As a result, the physical properties, such as the fluid penetrability (or porosity) and the compressive stress under the condition of a predetermined compression ratio, of each part of the finished brush roller may be different, and that will affect the subsequent brushing to the circuit substrate. In the present invention, in this regard, the brush roller mold will be rotated to timely change the floating direction of the bubbles in the PVA emulsified solution to reduce the floating area of the bubbles of the PVA emulsified solution during the curing process of the PVA emulsified solution containing bubbles in the brush roller mold. In this way, the bubble distribution in the PVA emulsified solution tends to be homogeneous, and the physical properties, such as the fluid penetrability and the compressive stress under the condition of a predetermined compression ratio, of each part of the finished brush roller tend to be consistent, thereby meets the requirements for brushing the circuit substrate.

Given the above, the present invention provides a brush roller and its manufacturing method and the brush roller mold. The gaseous hole filler is mainly used to make the PVA emulsified solution contain bubbles, and the PVA emulsified solution containing bubbles is placed into the brush roller mold for curing to form the brush roller with pores inside. Accordingly, the physical properties of the brush roller being manufactured meet the needs of brushing circuit substrates. It also solves the various problems brought by the use of the conventional brush roller due to the residue of the solid hole filler inside, which the conventional brush roller is made by using solid hole filler to carry out foaming.

Besides, any adjacent two of the plurality of fluid passages inside the brush roller of the present invention can connect and extend to the surface of the brush roller to create pores to provide the flow of fluid, which make the brush roller of the present invention have excellent fluid penetrability. In the brush roller manufacturing method of the present invention, moreover, the brush roller with desired compressive stress under the condition of a predetermined compression ratio is formed after the PVA emulsified solution being cured, and it can use in the brushing of circuit substrates. Furthermore, the brush block(s) of the brush roller of the present invention has the side support(s) that can provide lateral support to reduce the level of the brush block(s) deformed due to the stress during brushing to the circuit substrates, so that the brush block(s) can effectively contact the circuit substrates.

What is claimed is:

1. A brush roller manufacturing method, which to manufacture a brush roller, comprising the following steps:
preparing a PVA material, a cross-linking agent, a gaseous hole filler, and a brush roller mold;
resolving the PVA material in water to form a PVA aqueous solution;
adding the cross-linking agent into the PVA aqueous solution to allow the PVA material in the PVA aqueous solution for undergoing a cross-linking reaction and forming a PVA cross-linking solution;
adding the gaseous hole filler into the PVA cross-linking solution, and homogenizing the gaseous hole filler and the PVA cross-linking solution by stirring to form a PVA emulsified solution, which comprises bubbles formed by the gaseous hole filler with substantially homogeneous distribution; and placing the PVA emulsified solution into the brush roller mold until the PVA emulsified solution curing to a solid-state and forming the brush roller with desired compressive stress under the condition of a predetermined compression ratio; meanwhile, any adjacent two of the bubbles with a substantially homogeneous distribution in the PVA emulsified solution will connect to create a plurality of fluid passages on the brush roller, and any adjacent two of the plurality of fluid passages will connect as well and extend to the surface of the brush roller to create pores to provide the flow of fluid.

2. The brush roller manufacturing method according to claim 1, wherein a catalyst is further prepared and added during the formation of the PVA cross-linking solution or the PVA emulsified solution, thereby the PVA cross-linking solution or the PVA emulsified solution contains the catalyst to catalyze the cross-linking reaction, wherein the weight percentage of the catalyst in the PVA emulsified solution is between 1.5%-5%; the catalyst comprises at least a component selected from the group consisting of hydrochloric acid, sulfuric acid, phosphoric acid, and nitric acid.

3. The brush roller manufacturing method according to claim 1, wherein a surfactant is further prepared and added during the formation of the PVA cross-linking solution or the PVA emulsified solution, thereby the PVA cross-linking solution or the PVA emulsified solution contains the surfactant for maintaining the bubble state in the PVA emulsified solution, wherein the weight percentage of the surfactant in the PVA emulsified solution is between 0.4%-1.4%; the surfactant comprises at least a component selected from the group consisting of polypropylene glycol) diglycidyl ether, polyoxyethylene seearate, polyoxyethylene octylphenyl ether, and sodium dodecyl benzene sulfonate.

4. The brush roller manufacturing method according to claim 1, wherein the weight percentage of the cross-linking agent in the PVA emulsified solution is between 3%-9%; the cross-linking agent comprises at least a component selected from the group consisting of formaldehyde, acetaldehyde, glyoxal, propanal, butyraldehyde, butanedial, and glutaraldehyde.

5. The brush roller manufacturing method according to claim 1, wherein the volume ratio of the gaseous hole filler in the PVA emulsified solution is between 31%-45%.

6. The brush roller manufacturing method according to claim 1, wherein the curing temperature of the PVA emulsified solution is between 42° C.-65° C.

7. The brush roller manufacturing method according to claim 1, wherein the brush roller mold is rotated to reduce the floating area of the bubbles of the PVA emulsified solution during the curing process of the PVA emulsified solution in the brush roller mold, thereby the bubbles in the PVA emulsified solution maintain the substantially homogeneous distribution.

* * * * *